(12) United States Patent
Tauchi et al.

(10) Patent No.: US 9,530,562 B2
(45) Date of Patent: Dec. 27, 2016

(54) DIELECTRIC CERAMIC COMPOSITION AND DIELECTRIC DEVICE

(71) Applicant: TDK CORPORATION, Tokyo (JP)

(72) Inventors: Goushi Tauchi, Tokyo (JP); Tomoya Imura, Tokyo (JP); Masahito Furukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/759,539

(22) PCT Filed: Feb. 4, 2014

(86) PCT No.: PCT/JP2014/052479
§ 371 (c)(1),
(2) Date: Jul. 7, 2015

(87) PCT Pub. No.: WO2014/156301
PCT Pub. Date: Oct. 2, 2014

(65) Prior Publication Data
US 2015/0348709 A1    Dec. 3, 2015

(30) Foreign Application Priority Data
Mar. 27, 2013 (JP) .................................. 2013-066572

(51) Int. Cl.
| | | |
|---|---|---|
| C04B 35/495 | (2006.01) | |
| H01G 4/12 | (2006.01) | |
| G06F 17/10 | (2006.01) | |
| C04B 35/475 | (2006.01) | |
| H01B 3/12 | (2006.01) | |
| C04B 35/468 | (2006.01) | |
| C04B 35/626 | (2006.01) | |
| H01G 4/30 | (2006.01) | |

(52) U.S. Cl.
CPC ......... H01G 4/1227 (2013.01); C04B 35/4682 (2013.01); C04B 35/475 (2013.01);
(Continued)

(58) Field of Classification Search
CPC .. C04B 35/4682; C04B 35/495; H01G 4/1227
See application file for complete search history.

(56) References Cited

U.S. PATENT DOCUMENTS

2016/0049248 A1* 2/2016 Imura ................. H01G 4/1218
501/139

FOREIGN PATENT DOCUMENTS

| JP | H11-219844 A | 8/1999 |
|---|---|---|
| JP | 2002-321976 A | 11/2002 |

OTHER PUBLICATIONS

Dittmer et al., "Lead-free high-temperatue dielectrics with wide operation range", Journal of Applied Physics, 2011, vol. 109, pp. 034107-1-034107-5.
(Continued)

*Primary Examiner* — Karl Group
(74) *Attorney, Agent, or Firm* — Oliff PLC

(57) ABSTRACT

To provide a dielectric ceramic composition having a high dielectric constant, i.e., 3,000 or more, at elevated temperatures at or above 150° C. and having a practically sufficient relative dielectric constant at an applied DC electric field of 2 V/μm, and to provide a dielectric device including such a dielectric ceramic composition, a dielectric ceramic composition is a composite oxide represented by formula (1):

$$\{[(Bi_sNa_t)_a(Bi_uK_v)_bBa_c]_{1-d}Na_d\}_xTi_{1-d}Nb_dO_3 \qquad (1)$$

where a, b, c, d, s, t, u, v, and x are numbers satisfying the following conditions:
0.20≤a<0.95
0.00<b≤0.50
if 0.20<a<0.70, b<(1.20−a)/2
0.05≤c<0.60
if 0.20<a<0.70, c>(0.80−a)/2
a+b+c=1
0.02≤d<0.10
0.90≤s+u≤1.00
0.45≤t≤0.50
0.45≤v≤0.50
0.95≤x≤1.05.

2 Claims, 2 Drawing Sheets

(52) U.S. Cl.
CPC ...... *C04B 35/495* (2013.01); *C04B 35/62675* (2013.01); *G06F 17/10* (2013.01); *H01B 3/12* (2013.01); *H01G 4/1218* (2013.01); *C04B 2235/3201* (2013.01); *C04B 2235/3215* (2013.01); *C04B 2235/3251* (2013.01); *C04B 2235/3298* (2013.01); *C04B 2235/442* (2013.01); *C04B 2235/77* (2013.01); *H01G 4/30* (2013.01)

(56) References Cited

OTHER PUBLICATIONS

Dittmer et al., "A High-Temperature-Capacitor Dielectric Based on K0.5Na0.5NbO3-Modified Bi1/2Na1/2TiO3—Bi1/2K1/2TiO3", Journal of the American Ceramic Society, 2012, vol. 95 No. 11, pp. 3519-3524.

Zhu et al., "Dependence of depolarization temperature on cation vacancies and lattice distortion for lead-free 74 (Bil/2Nal/2) TiO3-20.8 (Bil/2K1/2) TiO3—5.2BaTiO3 ferroelectric ceramics", Applied Phisics Letters, 2009, vol. 94, pp. 182901-1-182901-3.

Liu et al., "Temperature-Independent Dielectric Properties of 0.82 [0.94Bi0.5Na0.5TiO3—0.06BaTiO3]—0.18K0.5Na0.5NbO3" Journal of Advanced Dielectrics, 2012 vol. 2 No. 1, pp. 1250006-1-1250006-6.

Rodel et al., "Electric-Field Effects in Bi-based Perovskites", 3rd International Congress on Ceramics (ICC3) Meeting Guide, 2010.

May 13, 2014 Search Report issued in International Patent Application No. PCT/JP2014/052479.

May 13, 2014 Written Opinion issued in International Patent Application No. PCT/JP2014/052479.

* cited by examiner

DIELECTRIC CERAMIC COMPOSITION AND DIELECTRIC DEVICE

TECHNICAL FIELD

The present invention relates to dielectric ceramic compositions and electronic components including such compositions, and particularly to dielectric ceramic compositions and dielectric devices suitable for medium- to high-voltage applications with relatively high voltage ratings.

BACKGROUND ART

With the increasing packing density of electronic circuits, there is a strong need for the miniaturization of electronic components. Accordingly, multilayer ceramic capacitors are rapidly becoming smaller while having higher capacitances and are used in a wide range of applications requiring varying characteristics.

For example, capacitors for medium- to high-voltage applications with voltage ratings greater than 100 V, which are used in equipment such as engine electric computer modules (ECM), fuel injectors, electronically controlled throttles, inverters, converters, HID headlamp units, battery control units for hybrid engines, and digital still cameras, are required to have high capacitances at high electric field strengths.

However, conventional dielectric ceramic compositions are designed for use with DC voltages at low electric field strengths, e.g., about 1 V/μm. If such dielectric ceramic compositions are used in multilayer ceramic capacitors composed of thinner layers at high electric field strengths, they exhibit a noticeable change in capacitance with applied DC electric field (hereinafter "change in DC bias"). This results in the problem of decreased effective capacitance.

The effective capacitance of multilayer ceramic capacitors decreases with increasing change in DC bias. If a multilayer ceramic capacitor used in an electronic device fails to provide the necessary capacitance specified in the design phase, the electronic device may operate unstably and eventually cease to operate.

The use of such multilayer ceramic capacitors as capacitors for medium- to high-voltage applications also encounters the problems of heat generated from densely packed electronic components and severe use environments such as automotive applications. It has therefore been desirable to achieve high capacitances at elevated temperatures at or above 150° C. under an applied DC voltage (DC bias).

Accordingly, it is desirable to use a dielectric ceramic composition that exhibits less change in DC bias, i.e., has a practically sufficient relative dielectric constant at high applied electric fields and a high relative dielectric constant at elevated temperatures at or above 150° C., for capacitors intended for use at high electric fields. As used herein, the term "high electric field" refers to, for example, an electric field strength of 2 V/μm, and the term "high relative dielectric constant" refers to, for example, 2,000.

To solve these problems, PTL 1 discloses a dielectric ceramic composition containing as a main component a compound containing metal elements including at least strontium, barium, lead, bismuth, and titanium. The atomic ratio of these metal elements is represented by the formula $(Sr_{1-v-w-x-y}Ba_vCa_wPb_xBi_y)Ti_zO_3+a$, where v, w, x, y, and z satisfy the following conditions:

$0.01 \leq v \leq 0.05$
$0 \leq w \leq 0.20$
$0.05 \leq x \leq 0.20$
$0.01 \leq y \leq 0.30$
$1.00 \leq z \leq 1.20$
$v+w+x+y \leq 0.50$ and a satisfies the excess oxygen content. The dielectric ceramic composition further contains a glass component containing at least one of lithium and boron in an amount of 0.1 to 10.0 parts by weight per 100 parts by weight of the major component. The main crystal phase of the dielectric ceramic composition is a perovskite-type crystal phase.

The dielectric ceramic composition disclosed in PTL 1 exhibits a change in relative dielectric constant of within −10% at an applied DC bias of 2 V/μm, which demonstrates good performance. One problem with this dielectric ceramic composition, however, is that the relative dielectric constant is relatively low, i.e., about 1,500. This dielectric ceramic composition is also not intended for use at elevated temperatures since PTL 1 discloses only the change in relative dielectric constant at temperatures up to 85° C.

CITATION LIST

Patent Literature

PTL 1: Japanese Unexamined Patent Application Publication No. 11-219844

SUMMARY OF INVENTION

Technical Problem

In view of the foregoing background, an object of the present invention is to provide a dielectric ceramic composition suitable for medium- to high-voltage applications with relatively high voltage ratings, having a high dielectric constant, i.e., 3,000 or more, at elevated temperatures at or above 150° C., and having a practically sufficient relative dielectric constant at an applied DC electric field of 2 V/μm, and to provide a dielectric device including such a dielectric ceramic composition.

Solution to Problem

To achieve the foregoing object, the present invention provides a dielectric ceramic composition that is a composite oxide represented by formula (1):

$$\{[(Bi_sNa_t)_a(Bi_uK_v)_bBa_c]_{1-d}A_d\}_xTi_{1-a}Nb_dO_3 \qquad (1)$$

where A is at least one element selected from lithium, sodium, and potassium; and a, b, c, d, s, t, u, v, and x are numbers satisfying the following conditions:

$0.20 \leq a < 0.95$
$0.00 < b \leq 0.50$
if $0.20 < a < 0.70$, $b < (1.20-a)/2$
$0.05 < c < 0.60$
if $0.20 < a < 0.70$, $c > (0.80-a)/2$
$a+b+c=1$
$0.02 \leq d < 0.10$
$0.90 \leq s+u \leq 1.00$
$0.45 \leq t \leq 0.50$
$0.45 \leq v \leq 0.50$
$0.95 \leq x \leq 1.05$ With the above configuration, the dielectric ceramic composition according to the present invention has a high dielectric constant, i.e., 3,000 or more, at elevated temperatures at or above 150° C. and also has a high relative dielectric constant, i.e., 2,000 or more, at an applied DC electric field of 2 V/μm.

The present invention further provides a dielectric device including the above dielectric ceramic composition.

This dielectric device, including the above dielectric ceramic composition, is useful as a capacitor for applications requiring high dielectric constants at high applied electric fields, for example, for the protection of circuits at high applied electric fields.

Advantageous Effects of Invention

The present invention provides a dielectric ceramic composition suitable for medium- to high-voltage applications with relatively high voltage ratings, having a high dielectric constant, i.e., 3,000 or more, at elevated temperatures at or above 150° C., and having a practically sufficient relative dielectric constant at an applied DC electric field of 2 V/μm, and also provides a dielectric device including such a dielectric ceramic composition.

DESCRIPTION OF EMBODIMENTS

Figure 1:
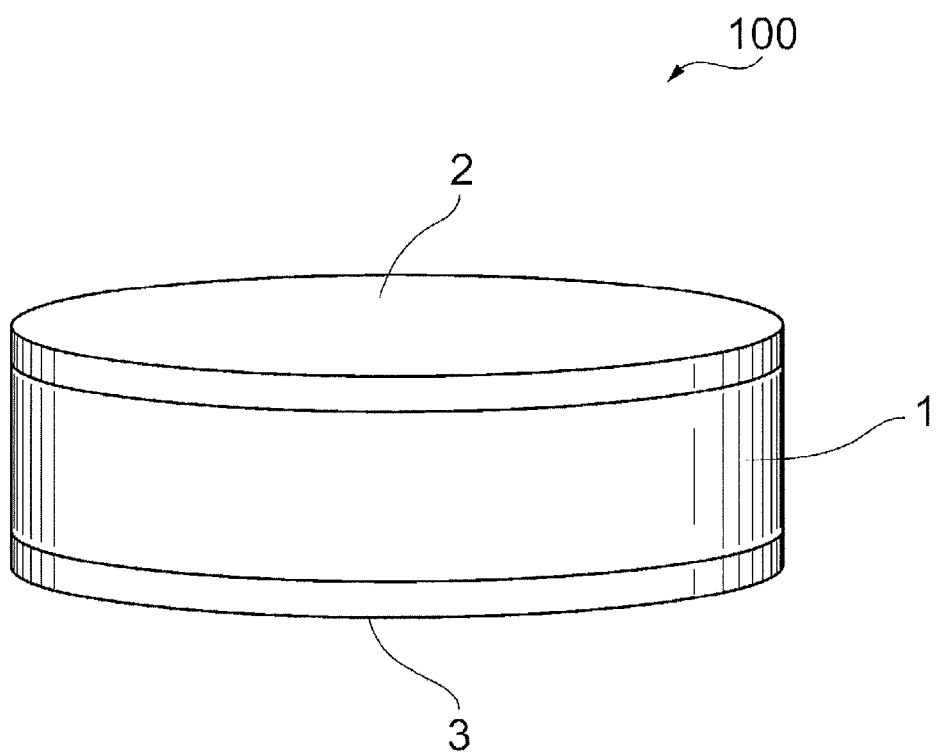
FIG. 1 illustrates a preferred embodiment of a dielectric device according to the present invention.

Preferred embodiments of the present invention will now be described occasionally with reference to the drawings, where like or similar elements are designated by like reference numerals to avoid duplication of description.

FIG. 1 illustrates a preferred embodiment of a dielectric device according to the present invention. A dielectric device 100 illustrated in FIG. 1 forms a capacitor including a disc-shaped dielectric 1 and a pair of electrodes 2 and 3 formed on both surfaces of the dielectric 1.

The dielectric 1 is made of a dielectric ceramic composition represented by formula (1):

$$\{[(Bi_sNa_t)_a(Bi_uK_v)_bBa_c]_{1-d}A_d\}_xTi_{1-d}Nb_dO_3 \qquad (1)$$

In formula (1), A is at least one element selected from lithium, sodium, and potassium, and a, b, c, d, s, t, u, v, and x are numbers satisfying the following conditions:

0.20≤a<0.95
0.00<b≤0.50
if 0.20<a<0.70, b<(1.20−a)/2
0.05≤c<0.60
if 0.20<a<0.70, c>(0.80−a)/2
a+b+c=1
0.02≤d<0.10
0.90≤s+u≤1.00
0.45≤t≤0.50
0.45≤v≤0.50
0.95≤x≤1.05

With the above configuration, the dielectric ceramic composition has a high relative dielectric constant at high applied electric fields.

The dielectric ceramic according to the present invention is a combination of ferroelectric compositions. The use of the particular combination provides a dielectric ceramic composition having a relative dielectric constant of 3,000 or more at 150° C. and good DC bias characteristics.

A dielectric ceramic composition where a, b, or c falls outside the above range is undesirable since it would have a relative dielectric constant of less than 3,000 at 150° C., poor DC bias characteristics, or low withstand voltage.

A dielectric ceramic composition where d is less than 0.02 is undesirable since it would have poor DC bias characteristics. A dielectric ceramic composition where d is 0.10 or more is undesirable since it would have a dielectric constant of less than 3,000 at 150° C.

A dielectric ceramic composition where s+u, t, or v falls outside the above range is undesirable since it would contain defects, leak charge due to insufficient sintered density, or have low withstand voltage.

A dielectric ceramic composition where x is less than 0.95 or more than 1.05 is undesirable since it would have insufficient sintered density and thus have low insulation resistance. Such a dielectric ceramic composition is difficult to use at high applied electric fields.

The composite oxide represented by formula (1) is preferably present in an amount of 90% or more of the total mass of the dielectric ceramic composition, for example, to achieve a practically sufficient dielectric constant for use as a dielectric ceramic composition. Impurities such as phosphorus and zirconium, which may be derived from the manufacturing process, may also be present.

The composition of the dielectric ceramic composition can be determined, for example, by X-ray fluorescence spectroscopy or ICP emission spectroscopy.

The dielectric ceramic composition preferably has a relative density of 95% or more. As used herein, the term "relative density" refers to the percentage of the measured density to the theoretical density. The theoretical density is calculated from the lattice constant determined by X-ray diffraction and the stoichiometric ratio determined based on a perfect crystal. The relative density of the dielectric ceramic composition can be determined, for example, by Archimedes' principle. The relative density of the dielectric ceramic composition can be controlled depending on the firing temperature and the firing time.

An example method for manufacturing the dielectric device illustrated in FIG. 1 will now be described.

Powdered materials such as bismuth oxide (Bi₂O₃), sodium carbonate (Na₂CO₃), potassium carbonate (K₂CO₃), barium carbonate (BaCO₃), titanium oxide (TiO₂), and niobium oxide (Nb₂O₅) powders are provided first as the starting materials for the dielectric 1.

These powdered materials are weighed out such that the dielectric ceramic composition after main firing (sintered compact) satisfies the composition of the dielectric ceramic composition according to this embodiment.

The weighed powdered materials are wet-mixed, for example, in a ball mill. The resulting wet mixture is calcined to obtain a calcined mixture. The calcination is typically performed in air. The calcination temperature is preferably 700° C. to 900° C. The calcination time is preferably 1 to 10 hours.

The resulting calcined mixture is wet-crushed, for example, in a ball mill, and is then dried to obtain a calcined powder. The resulting calcined powder is mixed with a small amount of binder and is then compacted by pressing to obtain a compact. The compaction pressure is preferably about 5 t/cm². The compact may have any shape; for example, it may be a disc-shaped compact having a planar size Φ of about 17 mm and a thickness of about 1 mm.

The resulting compact is fired to obtain a dielectric ceramic composition sample. The firing is typically performed in air. The firing temperature is preferably 950° C. to 1,300° C. The firing time is preferably 2 to 10 hours.

Metal electrodes such as silver electrodes are then formed on both surfaces of the resulting dielectric ceramic composition sample. The electrodes are formed by a process such as evaporation, sputtering, baking, or electroless plating.

Figure 2:
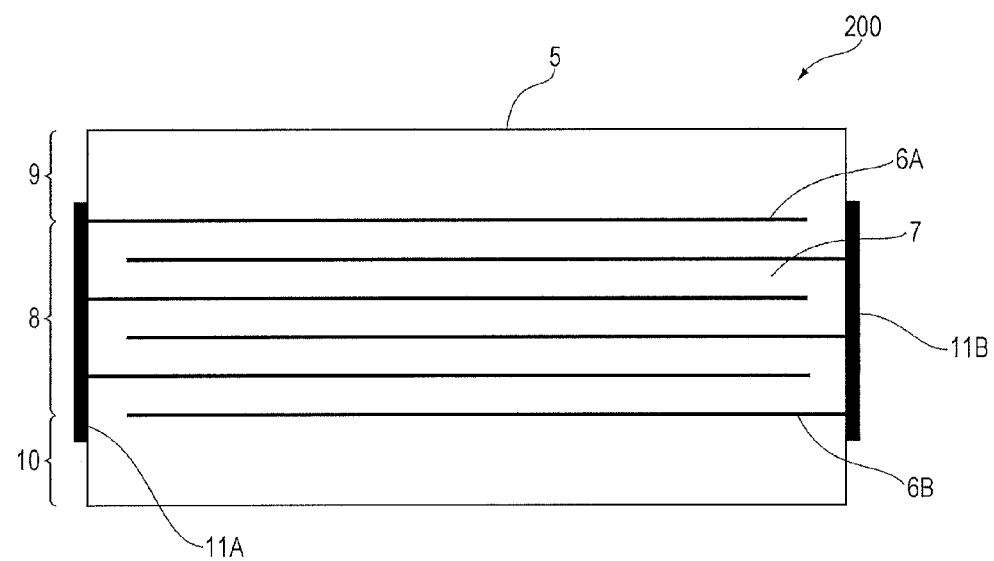
FIG. 2 is a sectional view of another embodiment of a dielectric device according to the present invention.

FIG. 2 is a sectional view of another embodiment of a dielectric device according to the present invention. A multilayer dielectric device 200 illustrated in FIG. 2 includes a rectangular laminate 5 and a pair of terminal electrodes 11A and 11B formed on the opposing end surfaces of the laminate 5.

The laminate 5 includes a block 8 composed of internal electrode layers (electrode layers) 6A and 6B alternately laminated with dielectric layers 7 therebetween and a pair of protective layers 9 and 10 disposed on the end surfaces of the block 8 in the lamination direction (i.e., in the top-to-bottom direction in the figure) such that the block 8 is sandwiched between the protective layers 9 and 10. The dielectric layers 7 and the internal electrode layers 6A and 6B are alternately laminated in the block 8.

The dielectric layers 7 are made of a dielectric ceramic composition according to the present invention.

Each dielectric layer 7 may have any thickness, for example, 1 to 100 μm.

The internal electrode layers 6A and 6B are arranged parallel to each other. The internal electrode layers 6A are exposed at one end thereof in the end surface of the laminate 5 on which the terminal electrode 11A is formed. The internal electrode layers 6B are exposed at one end thereof in the end surface of the laminate 5 on which the terminal electrode 11B is formed. The internal electrode layers 6A and 6B overlap over a large area in the lamination direction.

The internal electrode layers 6A and 6B are made of, for example, a metal such as gold, platinum, or silver.

The terminal electrodes 11A and 11B are disposed in contact with the ends of the internal electrode layers 6A and 6B, respectively, exposed in the end surfaces of the laminate 5 on which the terminal electrodes 11A and 11B are disposed. The terminal electrodes 11A and 11B are thus electrically connected to the internal electrode layers 6A and 6B, respectively. The terminal electrodes 11A and 11B may be made of a conductive material based on, for example, silver, gold, or copper. The thickness of the terminal electrodes 11A and 11B may be determined depending on, for example, the application and the size of the multilayer dielectric device. For example, the terminal electrodes 11A and 11B may have a thickness of 10 to 50 μm.

Whereas the dielectric ceramic composition and dielectric devices according to this embodiment have been described above, the dielectric ceramic composition is suitable, for example, for capacitors for medium- to high-voltage applications with relatively high voltage ratings since the dielectric ceramic composition has a high relative dielectric constant at elevated temperatures at or above 150° C. and also has good DC bias characteristics at high applied electric fields.

The present invention should not be construed as being limited to the above embodiments. For example, the above dielectric devices may be configured in the same manner as known dielectric devices except for the dielectric ceramic composition. In the manufacture of the above dielectric devices, the calcined powder may be manufactured, for example, by hydrothermal synthesis. As precursors, (BiNa)TiO$_3$, (BiK)TiO$_3$, BaTiO$_3$, and NaNbO$_3$ may be prepared before they are mixed and sintered.

EXAMPLES

The present invention is further illustrated by the following examples and comparative examples, although the present invention should not be construed as being limited to these examples.

Examples 1 to 35 and Comparative Examples 1 to 23

To prepare dielectric ceramic compositions, bismuth oxide (Bi$_2$O$_3$), sodium carbonate (Na$_2$CO$_3$), potassium carbonate (K$_2$CO$_3$), barium carbonate (BaCO$_3$), titanium oxide (TiO$_2$), and niobium oxide (Nb$_2$O$_5$) powders were provided as starting materials. For Example 5, a lithium carbonate (Li$_2$CO$_3$) powder was also provided. For Examples 6 and 7, a potassium carbonate (K$_2$CO$_3$) powder was also provided.

These powdered materials were weighed out such that the dielectric ceramic compositions after main firing (sintered compacts) satisfied the compositions shown in Table 1. In Table 1, a, b, c, d, s+u, t, v, and x indicate the values of a, b, c, d, s+u, t, v, and x, respectively, in formula (1) below. For the examples and comparative examples other than Examples 5 to 7, the component A is sodium. For Example 5, the component A is lithium. For Example 6, the component A is potassium. For Example 7, the component A is a combination of sodium and potassium.

$$\{[(Bi_sNa_t)_a(Bi_uK_v)_bBa_c]_{1-d}Na_d\}_xTi_{1-d}Nb_dO_3 \qquad (1)$$ 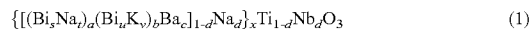

The weighed powdered materials were wet-mixed in a ball mill. The resulting mixtures were calcined in air at 850° C. for 2 hours to obtain calcined mixtures. The resulting calcined mixtures were wet-crushed in a ball mill to obtain calcined powders. The calcined powders were mixed with a small amount of binder and were then compacted under a pressure of about 5 t/cm$^2$ to obtain disc-shaped compacts having a planar size Φ of about 17 mm and a thickness of about 1 mm.

The resulting compacts were then fired in air at 950° C. to 1,300° C. for 2 to 10 hours under conditions where the relative density reached 95% to obtain dielectric ceramic composition samples. The densities of all resulting dielectric ceramic composition samples were measured to be 95% or more of the theoretical density.

The compositions of the resulting dielectric ceramic composition samples were determined to be identical to those of the weighed materials.

Silver electrodes were deposited on both surfaces of the resulting dielectric ceramic composition samples to fabricate dielectric devices.

The relative dielectric constants of the resulting dielectric devices were measured at an applied DC electric field of 2 V/μm.

Table 1 shows the relative dielectric constants at room temperature and at 150° C. and the relative dielectric constant at 150° C. and an applied DC electric field of 2 V/μm. The bars in the table indicate that no value was available because charge leaked during the measurement. In the "withstand voltage test" column in the table, "good" indicates that no dielectric breakdown occurred, and "poor" indicates that dielectric breakdown occurred. Samples that had relative dielectric constants of 3,000 or more at 150° C. and relative dielectric constants of 2,000 or more at an applied DC electric field of 2 V/μm were determined to be satisfactory.

TABLE 1

| | a | b | c | d | x | s + u | t | v | A | ε (0 V/μm) 25° C. | ε (0 V/μm) 150° C. | ε (2 V/μm) 150° C. | Withstand voltage test 5 V/μm |
|---|---|---|---|---|---|---|---|---|---|---|---|---|---|
| Comparative Example 1 | 0.60 | 0.10 | 0.30 | 0.01 | 0.99 | 1.00 | 0.50 | 0.50 | Na | 1352 | 4201 | 1809 | Good |
| Comparative Example 2 | 0.60 | 0.30 | 0.10 | 0.01 | 0.99 | 1.00 | 0.50 | 0.50 | Na | 1405 | 4409 | 1874 | Good |
| Example 1 | 0.33 | 0.33 | 0.33 | 0.02 | 0.99 | 1.00 | 0.50 | 0.50 | Na | 1224 | 3157 | 3043 | Good |
| Example 2 | 0.60 | 0.10 | 030 | 0.02 | 0.99 | 1.00 | 0.50 | 0.50 | Na | 1222 | 3760 | 4037 | Good |
| Example 3 | 0.20 | 0.40 | 0.40 | 0.03 | 0.99 | 1.00 | 0.50 | 0.50 | Na | 776 | 3616 | 3197 | Good |
| Comparative Example 3 | 0.20 | 0.60 | 0.20 | 0.03 | 0.99 | 1.00 | 0.50 | 0.50 | Na | 1082 | 2841 | 1911 | Good |
| Example 4 | 0.33 | 0.33 | 0.33 | 0.03 | 0.99 | 1.00 | 0.50 | 0.50 | Na | 858 | 3064 | 3243 | Good |
| Example 5 | 0.33 | 0.33 | 0.33 | 0.03 | 0.99 | 1.00 | 0.50 | 0.50 | Li | 1384 | 3082 | 3093 | Good |
| Example 6 | 0.33 | 0.33 | 0.33 | 0.03 | 0.99 | 1.00 | 0.50 | 0.50 | K | 842 | 3101 | 3144 | Good |
| Example 7 | 0.33 | 0.33 | 0.33 | 0.03 | 0.99 | 1.00 | 0.50 | 0.50 | Na, K | 837 | 3128 | 3431 | Good |
| Example 8 | 0.40 | 0.20 | 0.40 | 0.03 | 0.99 | 1.00 | 0.50 | 0.50 | Na | 795 | 3579 | 3810 | Good |
| Comparative Example 4 | 0.40 | 0.40 | 0.20 | 0.03 | 0.99 | 1.00 | 0.50 | 0.50 | Na | 1007 | 3481 | 1732 | Good |
| Comparative Example 5 | 0.50 | 0.00 | 0.50 | 0.03 | 0.99 | 1.00 | 0.50 | 0.50 | Na | 808 | 3846 | 3948 | Poor |
| Example 9 | 0.50 | 0.20 | 0.30 | 0.03 | 0.99 | 1.00 | 0.50 | 0.50 | Na | 977 | 3510 | 4024 | Good |
| Example 10 | 0.50 | 0.30 | 0.20 | 0.03 | 0.99 | 1.00 | 0.50 | 0.50 | Na | 1020 | 3723 | 2504 | Good |
| Comparative Example 6 | 0.50 | 0.50 | 0.00 | 0.03 | 0.99 | 1.00 | 0.50 | 0.50 | Na | 1442 | 2842 | 919 | Poor |
| Example 11 | 0.60 | 0.10 | 0.30 | 0.03 | 0.99 | 1.00 | 0.50 | 0.50 | Na | 744 | 3653 | 4168 | Good |
| Example 12 | 0.60 | 0.20 | 0.20 | 0.03 | 0.99 | 1.00 | 0.50 | 0.50 | Na | 1552 | 3199 | 3484 | Good |
| Comparative Example 7 | 0.60 | 0.30 | 0.10 | 0.03 | 0.99 | 1.00 | 0.50 | 0.50 | Na | 1129 | 3901 | 1853 | Good |
| Example 13 | 0.70 | 0.10 | 0.20 | 0.03 | 0.99 | 1.00 | 0.50 | 0.50 | Na | 928 | 4547 | 3045 | Good |
| Example 14 | 0.70 | 0.20 | 0.10 | 0.03 | 0.99 | 1.00 | 0.50 | 0.50 | Na | 1580 | 4036 | 2216 | Good |
| Comparative Example 8 | 1.00 | 0.00 | 0.00 | 0.03 | 0.99 | 1.00 | 0.50 | 0.50 | Na | 740 | 1502 | 835 | Poor |
| Comparative Example 9 | 0.20 | 0.20 | 0.60 | 0.05 | 0.99 | 1.00 | 0.50 | 0.50 | Na | 1557 | 2795 | 2828 | Good |
| Example 15 | 0.33 | 0.33 | 0.33 | 0.05 | 0.99 | 1.00 | 0.50 | 0.50 | Na | 1480 | 3002 | 3167 | Good |
| Comparative Example 10 | 0.40 | 0.20 | 0.40 | 0.05 | 0.93 | 1.00 | 0.50 | 0.50 | Na | — | — | — | Poor |
| Example 16 | 0.40 | 0.20 | 0.40 | 0.05 | 0.95 | 1.00 | 0.50 | 0.50 | Na | 1724 | 3112 | 3211 | Good |
| Comparative Example 11 | 0.40 | 0.20 | 0.40 | 0.05 | 0.99 | 0.80 | 0.45 | 0.45 | Na | 1025 | 2265 | 1824 | Poor |
| Example 17 | 0.40 | 0.20 | 0.40 | 0.05 | 0.99 | 0.90 | 0.45 | 0.45 | Na | 1214 | 3126 | 2196 | Good |
| Comparative Example 12 | 0.40 | 0.20 | 0.40 | 0.05 | 0.99 | 0.95 | 0.40 | 0.50 | Na | — | — | — | Poor |
| Example 18 | 0.40 | 0.20 | 0.40 | 0.05 | 0.99 | 0.95 | 0.45 | 0.50 | Na | 1324 | 3091 | 2318 | Good |
| Comparative Example 13 | 0.40 | 0.20 | 0.40 | 0.05 | 0.99 | 0.95 | 0.50 | 0.40 | Na | — | — | — | Poor |
| Example 19 | 0.40 | 0.20 | 0.40 | 0.05 | 0.99 | 0.95 | 0.50 | 0.45 | Na | 1706 | 3135 | 2324 | Good |
| Example 20 | 0.40 | 0.20 | 0.40 | 0.05 | 0.99 | 0.95 | 0.50 | 0.50 | Na | 1822 | 3129 | 2468 | Good |
| Comparative Example 14 | 0.40 | 0.20 | 0.40 | 0.05 | 0.99 | 0.95 | 0.50 | 0.55 | Na | 841 | 1484 | 1453 | Poor |
| Comparative Example 15 | 0.40 | 0.20 | 0.40 | 0.05 | 0.99 | 0.95 | 0.55 | 0.50 | Na | 836 | 1519 | 1416 | Poor |
| Example 21 | 0.40 | 0.20 | 0.40 | 0.05 | 0.99 | 1.00 | 0.50 | 0.50 | Na | 1509 | 3069 | 3134 | Good |
| Comparative Example 16 | 0.40 | 0.20 | 0.40 | 0.05 | 0.99 | 1.10 | 0.50 | 0.50 | Na | 795 | 1540 | 1384 | Poor |
| Example 22 | 0.40 | 0.20 | 0.40 | 0.05 | 1.05 | 1.00 | 0.50 | 0.50 | Na | 1510 | 3094 | 2749 | Good |
| Comparative Example 17 | 0.40 | 0.20 | 0.40 | 0.05 | 1.06 | 1.00 | 0.50 | 0.50 | Na | 1405 | — | — | Poor |
| Comparative Example 18 | 0.50 | 0.00 | 0.50 | 0.05 | 0.99 | 1.00 | 0.50 | 0.50 | Na | 1468 | 3109 | 3120 | Poor |
| Example 23 | 0.50 | 0.01 | 0.49 | 0.05 | 0.99 | 1.00 | 0.50 | 0.50 | Na | 1458 | 3210 | 3349 | Good |
| Example 24 | 0.50 | 0.20 | 0.30 | 0.05 | 0.99 | 1.00 | 0.50 | 0.50 | Na | 1613 | 3452 | 3685 | Good |
| Example 25 | 0.60 | 0.10 | 0.30 | 0.05 | 0.99 | 1.00 | 0.50 | 0.50 | Na | 1569 | 3820 | 3521 | Good |
| Comparative Example 19 | 0.70 | 0.00 | 0.30 | 0.05 | 0.99 | 1.00 | 0.50 | 0.50 | Na | 1512 | 3084 | 3338 | Poor |
| Example 26 | 0.70 | 0.10 | 0.20 | 0.05 | 0.99 | 1.00 | 0.50 | 0.50 | Na | 1721 | 3441 | 3419 | Good |
| Example 27 | 0.70 | 0.25 | 0.05 | 0.05 | 0.99 | 1.00 | 0.50 | 0.50 | Na | 1721 | 4033 | 3776 | Good |
| Example 28 | 0.80 | 0.10 | 0.10 | 0.05 | 0.99 | 1.00 | 0.50 | 0.50 | Na | 1753 | 4356 | 4315 | Good |
| Example 29 | 0.94 | 0.01 | 0.05 | 0.05 | 0.99 | 1.00 | 0.50 | 0.50 | Na | 1677 | 4298 | 4202 | Good |
| Example 30 | 0.33 | 0.33 | 0.33 | 0.07 | 0.99 | 1.00 | 0.50 | 0.50 | Na | 1645 | 3175 | 3374 | Good |
| Example 31 | 0.70 | 0.20 | 0.10 | 0.07 | 0.99 | 1.00 | 0.50 | 0.50 | Na | 1824 | 4035 | 4223 | Good |
| Example 32 | 0.80 | 0.10 | 0.10 | 0.07 | 0.99 | 1.00 | 0.50 | 0.50 | Na | 1701 | 4065 | 3818 | Good |
| Example 33 | 0.20 | 0.50 | 0.30 | 0.09 | 0.99 | 1.00 | 0.50 | 0.50 | Na | 1000 | 3188 | 2633 | Good |
| Example 34 | 0.40 | 0.05 | 0.55 | 0.09 | 0.99 | 1.00 | 0.50 | 0.50 | Na | 1600 | 3001 | 3144 | Good |
| Example 35 | 0.40 | 0.20 | 0.40 | 0.09 | 0.99 | 1.00 | 0.50 | 0.50 | Na | 1536 | 3064 | 3285 | Good |
| Comparative Example 20 | 0.45 | 0.00 | 0.55 | 0.09 | 0.99 | 1.00 | 0.50 | 0.50 | Na | 1559 | 2491 | 2597 | Good |
| Comparative Example 21 | 0.10 | 0.10 | 0.80 | 0.10 | 0.99 | 1.00 | 0.50 | 0.50 | Na | 2323 | 1481 | 1434 | Good |
| Comparative Example 22 | 0.50 | 0.00 | 0.50 | 0.10 | 0.99 | 1.00 | 0.50 | 0.50 | Na | 2473 | 2287 | 2324 | Good |
| Comparative Example 23 | 0.60 | 0.20 | 0.20 | 0.10 | 0.99 | 1.00 | 0.50 | 0.50 | Na | 2078 | 2854 | 2880 | Good |

The above results demonstrate that the dielectric ceramic compositions of Examples 1 to 35 had practically sufficient dielectric constants at high applied electric fields and also had high dielectric constants at elevated temperatures at or above 150° C.

REFERENCE SIGNS LIST

1 dielectric, 2, 3 electrode, 5 laminate, 6A, 6B internal electrode layer, 7 dielectric layer, 8 block, 9, 10 protective layer, 11A, 11B terminal electrode, 100 dielectric device, 200 multilayer dielectric device

The invention claimed is:

1. A dielectric ceramic composition having a composition of general formula (1):

$$\{[(Bi_sNa_t)_a(Bi_uK_v)_bBa_c]_{1-d}Na_d\}_xTi_{1-d}Nb_dO_3 \qquad (1)$$

wherein A is at least one element selected from lithium, sodium, and potassium; and a, b, c, d, s, t, u, v, and x are numbers satisfying the following conditions:

$0.20 \leq a < 0.95$ $0.00 < b \leq 0.50$ if $0.20 < a < 0.70$, $b < (1.20-a)/2$ $0.05 \leq c < 0.60$ if $0.20<a<0.70$, $c>(0.80-a)/2$
$a+b+c=1$
$0.02 \leq d < 0.10$
$0.90 \leq s+u \leq 1.00$
$0.45 \leq t \leq 0.50$
$0.45 \leq v \leq 0.50$
$0.95 \leq x \leq 1.05$.

2. A dielectric device comprising the dielectric ceramic composition according to claim 1.

* * * * *